US006628288B1

(12) United States Patent
Potter et al.

(10) Patent No.: US 6,628,288 B1
(45) Date of Patent: Sep. 30, 2003

(54) SELECTABLE BACK END UNIT

(75) Inventors: Michael Potter, Huntsville, AL (US); Clifford A. Whitmore, Huntsville, AL (US); Jeff S. Ford, Madison, AL (US)

(73) Assignee: 3Dlabs, Inc., Ltd., Hamilton (BM)

( * ) Notice: Subject to any disclaimer, the term of this patent is extended or adjusted under 35 U.S.C. 154(b) by 0 days.

(21) Appl. No.: 09/633,092

(22) Filed: Aug. 4, 2000

Related U.S. Application Data

(60) Provisional application No. 60/147,722, filed on Aug. 6, 1999.

(51) Int. Cl.[7] .................................................. G06F 15/16

(52) U.S. Cl. ........................ 345/502; 345/519; 345/600; 345/501; 345/589; 345/591; 345/856; 345/505

(58) Field of Search ................................. 345/506, 856, 345/600, 591, 589, 520, 519, 501, 502, 505; 348/675, 674

(56) References Cited

U.S. PATENT DOCUMENTS 5,227,863 A * 7/1993 Bilbrey et al. ................ 358/22
5,442,379 A * 8/1995 Bruce et al. ................ 345/199
5,821,918 A * 10/1998 Reinert et al. .............. 345/154

* cited by examiner

*Primary Examiner*—Mark Zimmerman
*Assistant Examiner*—Kimbinh T. Nguyen
(74) *Attorney, Agent, or Firm*—Arnall Golden Gregory LLP

(57) ABSTRACT

A back end unit for use with a graphics processor includes an input for receiving graphics data streams from the graphics processor, an output for transmitting graphics data streams, and a plurality of paths, coupled with the input and output, that direct graphics data streams between the input and the output. The plurality of paths direct data between the various modules that are a part of the back end unit. To that end, among other things, the back end unit also includes a gamma correction module that applies gamma correction operations to graphics data streams, a cursor module that adds cursor data to graphics data streams, and a digital to analog converter that converts the graphics data streams from a digital format to an analog format. The plurality of paths thus permit graphics data streams to pass through no more than two of the gamma correction module, the cursor module, and the digital to analog converter.

23 Claims, 4 Drawing Sheets

SELECTABLE BACK END UNIT

PRIORITY

This application claims priority from provisional U.S. patent application Ser. No. 60/147,722, filed Aug. 6, 1999, entitled "SELECTABLE BACK END UNIT", the disclosure of which is incorporated herein, in its entirety, by reference.

FIELD OF THE INVENTION

The invention generally relates to graphics processing and, more particularly, the invention relates to post processing of graphical display streams processed by a graphics processor.

BACKGROUND OF THE INVENTION

To reduce the computational burden of their host microprocessors, many computer systems have graphics processors for processing graphics request code. Many such graphics processors typically include a back end unit that formats the processed graphics request code into a specified output format for display by a display device. For example, processed graphics request code may be formatted by a back end unit for display by a specific display device, such as a cathode ray tube monitor. As known in the art, prior to being displayed on a monitor, processed graphics request code commonly must be gamma corrected to compensate for the nonlinear characteristics of the drive electronics of the monitor. Moreover, cursor data often is not added during processing and thus, if desired, must be added by the back end unit. Accordingly, back end units commonly include a random access memory/digital to analog converter ("RAMDAC") that both applies gamma correction, and adds cursor data to processed graphics request code.

It often is unnecessary, however, to apply gamma correction to a processed graphics request stream that already has been gamma corrected, or to a processed graphics request stream that is to be stored in memory and thus, not immediately displayed. Moreover, it often is unnecessary to add cursor data to the processed graphics request code when it is to be stored in a memory device, or when no cursor is required. Accordingly, applying gamma correction and adding cursor data to processed graphics request code often is redundant, and undesirably can add extraneous data to the processed graphics request code.

SUMMARY OF THE INVENTION

In accordance with one aspect of the invention, a back end unit for use with a graphics processor includes an input for receiving graphics data streams from the graphics processor, an output for transmitting graphics data streams, and a plurality of paths, coupled with the input and output, that direct graphics data streams between the input and the output. In accord with preferred embodiments, the plurality of paths direct data between the various modules that are a part of the back end unit. To that end, among other things, the back end unit also includes a gamma correction module that applies gamma correction operations to graphics data streams, a cursor module that adds cursor data to graphics data streams, and a digital to analog converter that converts the graphics data streams from a digital format to an analog format. The plurality of paths thus permit graphics data streams to pass through no more than two of the gamma correction module, the cursor module, and the digital to analog converter.

In preferred embodiments, the plurality of paths includes a pass-through path that permits graphics data streams to pass directly from the input to the output. The plurality of paths also may include a gamma module bypass path that permits graphics data streams to bypass the gamma correction module. Although it bypasses the gamma correction module, the gamma module bypass path permits graphics data streams to pass through at least one of the cursor module and the digital to analog converter. In addition to or instead of those paths noted above, the plurality of paths also may include a double bypass path that permits graphics data streams to bypass both the gamma correction module and the cursor module. The double bypass module path therefore permits graphics data streams to pass through the digital to analog converter. Furthermore, the plurality of paths may include a cursor module bypass path that permits graphics data streams to bypass the cursor module. The cursor module bypass path thus permits graphics data streams to pass through at least one of the gamma correction module and the digital to analog converter.

In accordance with another aspect of the invention, a back end unit for use with a graphics processor includes an input for receiving graphics data streams, a plurality of functional modules that process graphics data streams, an output, and a switching system providing a plurality of paths for alternatively electrically connecting the various functional modules in a plurality of configurations. The functional modules include a gamma correction module for applying gamma correction to the graphics data streams, a cursor module for adding cursor data to the graphics data streams, and a digital to analog converter.

The switching system preferably provides an electrical path through no more than two of the gamma correction module, the cursor module, and the digital to analog converter. The plurality of paths may include a pass-through path that permits graphics data streams to pass directly from the input to the output. The output may include an analog output that forwards analog signals from the digital to analog converter, and a digital output that forwards digital signals. In such case, the switching system may alternatively switch between the digital output and the analog output. The plurality of paths also may include a gamma module bypass path that permits graphics data streams to bypass the gamma correction module and yet, pass through at least one of the cursor module and the digital to analog converter. The plurality of paths also may include a double module bypass path that permits graphics data streams to bypass both the gamma correction module and cursor module, while still passing through the digital to analog converter. The plurality of paths may further include a cursor module bypass path that permits graphics data streams to bypass the cursor module, while still passing through at least one of the gamma correction module and the digital to analog converter.

In accordance with still another aspect of the invention, a back end unit for use with a graphics processor includes an input for receiving graphics data streams from the graphics processor, an output for transmitting graphics data streams, and a plurality of functional modules between the input and the output. The plurality of functional modules each includes logic for processing graphics data streams received by the input. The back end unit also includes a switching system capable of alternatively coupling the input, output, and the plurality of functional modules. Among other things, the switching system is capable of bypassing one or more of the functional modules.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

In accord with preferred embodiments of the invention, a graphics processor has a back end unit that configures processed graphics request streams prior to being transmitted to various output devices. Specifically, the back end unit may apply post processing processes to graphics request streams for display to an analog display device, or for use by a digital device, such as a nonvolatile memory device. Among other things, the back end unit includes a random access memory digital to analog converter ("RAMDAC 26") that is specially configured to apply selected post processing processes to the graphics request streams. Details of the graphics processor and RAMDAC 26 are shown below with reference to FIGS. 1 and 2.

Figure 1:
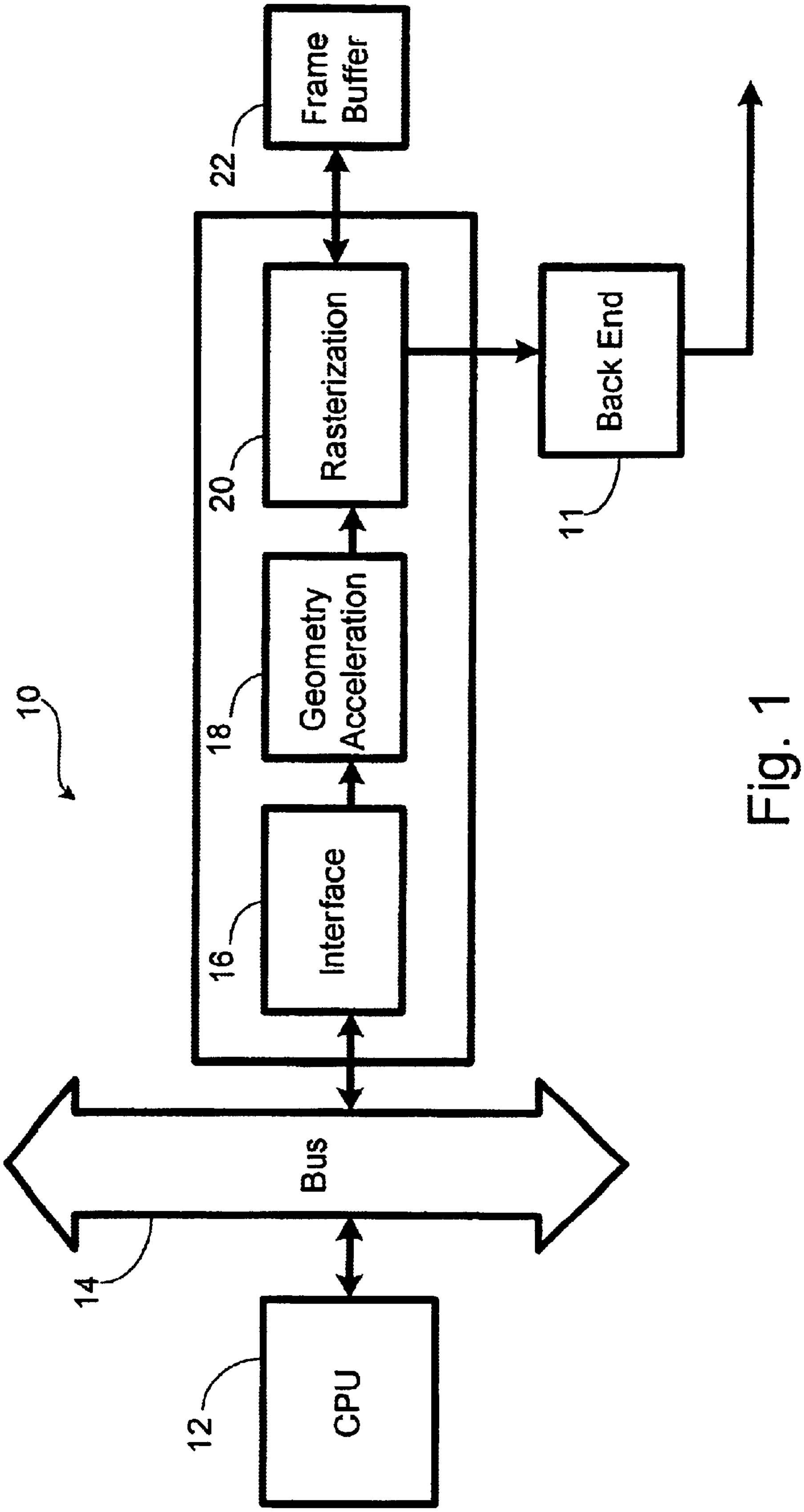
FIG. 1 schematically shows a computer system that may be utilized with preferred embodiments of the invention.

FIG. 1 schematically shows an exemplary computer system upon which preferred embodiments of the invention may be implemented. The computer system may be any computer system known in the art, such as an Intergraph EXTREME-Z™ graphics workstation (distributed by Intergraph Corporation of Huntsville, Ala.), which displays relatively complex graphics on a display device (not shown). In preferred embodiments, the computer system includes a multi-processor graphics accelerator 10 and an accompanying back end unit 11. In addition, such computer system also includes a central processing unit 12, and a system bus 14 for delivering commands from the central processing unit 12 to the graphics accelerator 10.

Among other things, the graphics accelerator 10 preferably includes a bus interface 16 for interfacing with the system bus 14, a geometry acceleration stage 18 for calculating attribute data (e.g., color, depth, transparency, intensity, etc . . . ) for vertices of triangles utilized with known tessellation techniques, and a rasterization stage 20 for calculating attribute data for the pixels within each triangle. The rasterization stage 20 forwards the calculated pixel data to a frame buffer 22 for display on a display device. The rasterization stage 20 includes a plurality of resolvers (not shown) that retrieve data from the frame buffer 22, and forward such data to the back end unit 11 for processing in accord with preferred embodiments of the invention.

Figure 2A:
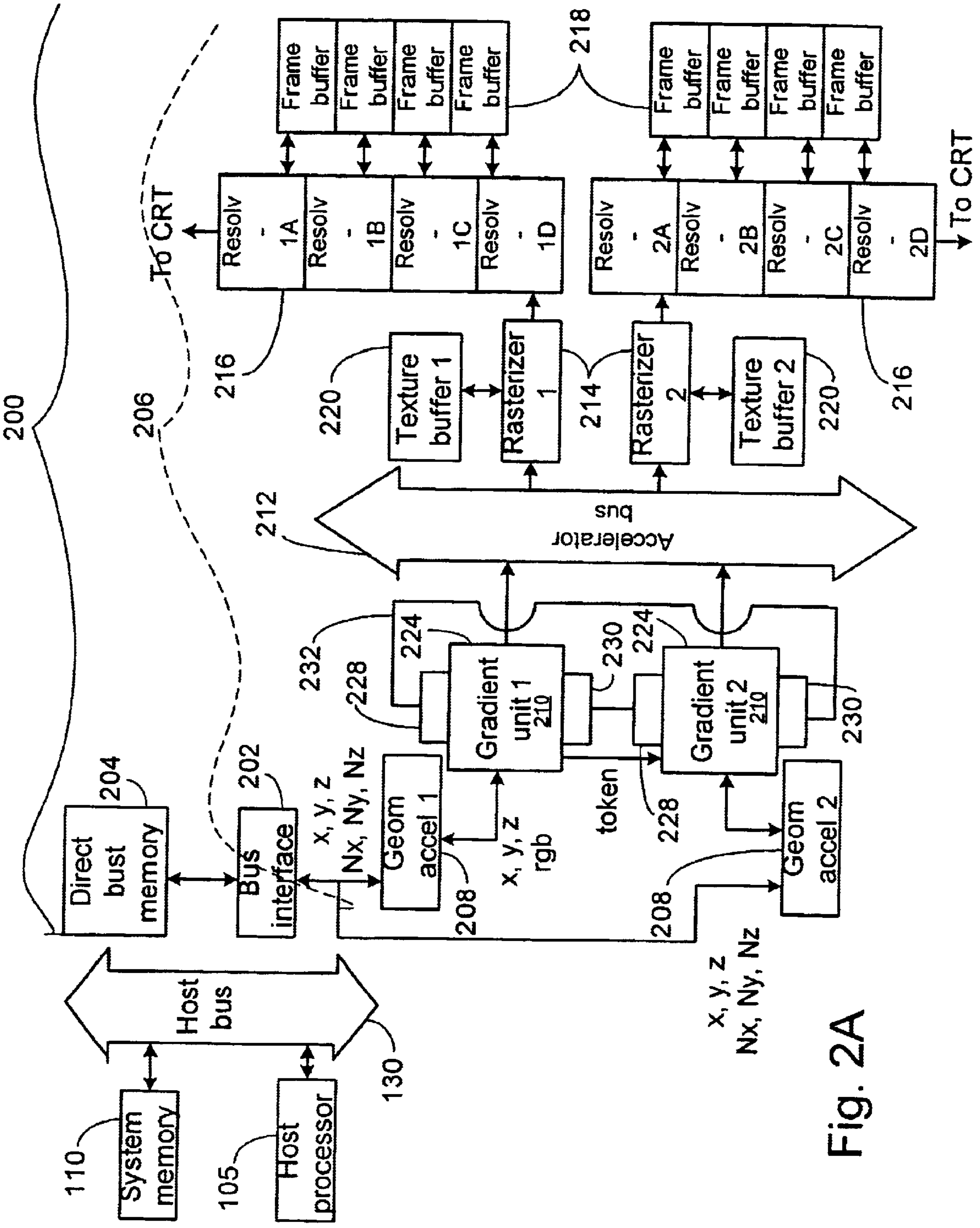
FIG. 2A schematically shows an exemplary graphics accelerator that may be utilized, with illustrative embodiments of the invention.
Figure 2B:
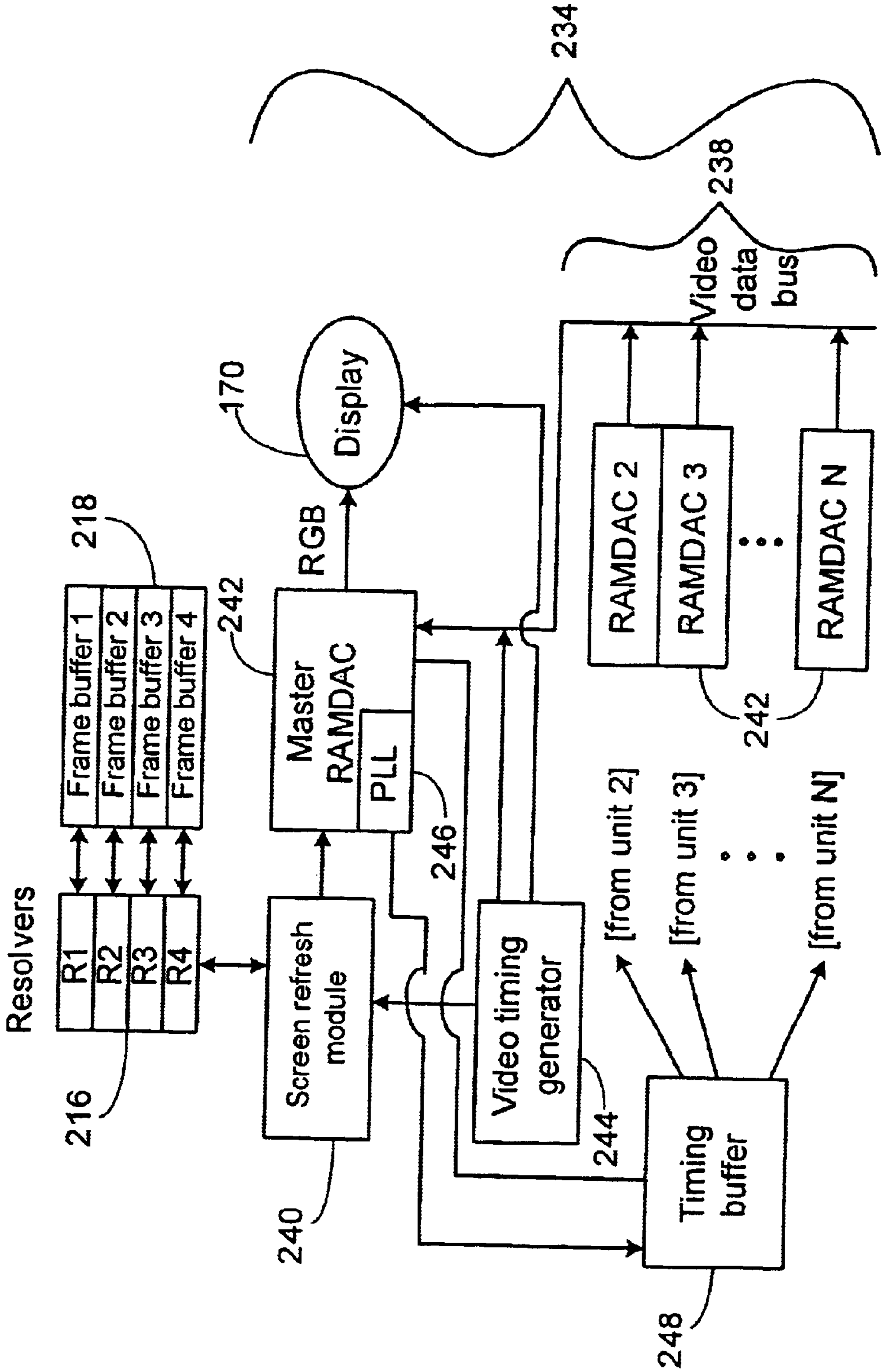
FIG. 2B schematically shows an exemplary back end unit that may be utilized with illustrative embodiments of the invention.

FIGS. 2A and 2B schematically show an illustrative graphics accelerator 10A in greater detail than that shown in FIG. 1. The exemplary graphics accelerator 10A in FIGS. 2A and 2B has two geometry accelerators 18A (described below) and two post geometry accelerator processors (i.e., two rasterizer/gradient unit pairs, discussed below, referred to herein as attribute processors). Of course, because two of each type of processor are discussed for simplicity, it should be apparent to those skilled in the art that additional or fewer processors may be utilized.

The graphics accelerator 10A preferably includes a plurality of parallel processing units that divide the graphics processing in an efficient manner among processors. Accordingly graphics request streams may be more rapidly processed for display by a display device.

The graphics accelerator 10A preferably includes a bus interface 16A for interfacing with the system bus 14A, memory 204 (e.g., DIRECT BURST™ memory) for temporarily storing graphics request streams received from the host processor 12, and the plurality of processing units for processing the graphics request stream. In preferred embodiments, the memory 204 is in the form of "write combining memory", commonly defined and utilized by Intel microprocessors (e.g., PENTIUM II™ central processing units), available from Intel Corporation of Santa Clara, Calif. Such memory 204 preferably is configured to receive graphics request stream data in bursts directly from the CPU. See, for example, copending U.S. patent application entitled "Method and Apparatus for Transporting Information to a Graphic Accelerator Card," filed on Jun. 30, 1999, and assigned attorney docket number 1247/A33 for more details on the use of memory 204, the disclosure of which is incorporated herein, in its entirety, by reference.

The plurality of processing units preferably process three dimensional ("3D") graphical images as a plurality of individual triangles defined in 3D space. As known in the art, this method of processing 3D graphical images is known as "tessellation." The plurality of processing units receives incoming triangle vertex data and, based upon such vertex data, ultimately draws each triangle on the display device. The incoming vertex data for a given vertex preferably includes the X, Y, and Z coordinate data for the given vertex (identifying the location of the vertex in 3D space), and three directional vector components ("normal vectors") that are perpendicular to the surface of the triangle at that given vertex.

Accordingly, the plurality of processors preferably includes a plurality of parallel geometry accelerators 18A that each receive the incoming triangle vertex data from the bus interface 16A and, based upon such incoming data, calculate attribute data (e.g., color data, depth data, transparency data, intensity data, coordinates of the vertices on the display device, etc . . . ) for each of the vertices in the triangle. In preferred embodiments, the state of each geometry accelerator 18A is preconfigured with previously received state data received from the host processor 12. When in a given state, a given geometry accelerator processes the incoming data to produce the vertex attributes in accord with the preconfigured state. For example, mathematical models of various images (e.g., a golf ball) and light sources may be stored within memory of the geometry accelerators 18A. Such models may be retrieved and utilized to produce the vertex attribute data upon receipt of state data setting the state of the geometry accelerators 18A. The state of a given geometry accelerator 18A may be changed upon receipt of new state data that correspondingly changes the state of the given geometry accelerator 18A.

Once calculated by the geometry accelerators 18A, the vertex attribute data is transmitted to the attribute processors. More particularly, the vertex attribute data is forwarded to a plurality of parallel gradient producing units 210 that each calculate gradient data for one of the triangles. In general terms, gradient data indicates the rate of change of attributes for each pixel in a triangle as a function of the location of each pixel in the triangle. In preferred embodiments, the gradient data is in the form of mathematical derivatives. The gradient data and attribute data then are broadcasted, via an accelerator bus 212, to a plurality of parallel rasterizers 20A. Each rasterizer 20A calculates pixel attribute data for select pixels within a triangle based upon the vertex attribute data and the gradient data. A plurality of resolvers 216 then stores the resultant attribute data for each pixel in one of a plurality of frame buffers 22A. A texture buffer 220 also may be included for performing texture operations.

FIG. 2B schematically shows a preferred set of back end units 11A for displaying frame buffer information on a display device. The set of back end units 11A includes a master back end unit and a plurality of slave back end units. Among other things, the master back end unit includes a screen refresh module 240 for retrieving digital frame buffer data from its associated frame buffer 22A via the associated resolvers 216, a master RAMDAC 26A (random access memory digital to analog converter) for performing gamma correction, digital to analog conversion, and synchronization timing functions, and a video timing generator 244 for generating timing signals for each of the aforementioned master back end unit elements and the display device. The master RAMDAC 26A preferably includes a phase locked loop 246 for creating a timing signal that is transmitted to a timing buffer 248 memory on the graphics accelerator 10A. The timing buffer 248 is coupled with each of the back end units for delivering synchronized timing signals to each of the slave units 238.

Each of the slave back end units 238 similarly includes a screen refresh module 240, a RAMDAC 26A, and video timing generator 244. The RAMDAC 26A of each slave unit 238 preferably is coupled to the master RAMDAC 26A. This coupling may be either via a direct input into the master RAMDAC 26A, via a single video bus, or serially via other slave RAMDACs 26A. As shown below, in preferred embodiments, only the video timing generator 244 of the master back end unit is coupled with the display device. The video timing generator 244 of the slave units 238, however, are not coupled with the display device. Each screen refresh module 240 is coupled to its associated set of resolvers 216 for retrieving data from its associated frame buffer 22A. Only one set of resolvers 216, however, is shown in FIG. 2B. That set of resolvers 216 is associated with the master back end unit.

In preferred embodiments, the graphics accelerator 10 or 10A, as well as the back end units 11 or 11A, are similar to those disclosed in copending U.S. patent application entitled, "MULTI-PROCESSOR GRAPHICS ACCELERATOR," filed on Jul. 15, 1999 as Ser. No. 09/354,462 and identified by attorney docket number 1247/A22, the disclosure of which is incorporated herein, in its entirety, by reference, and copending U.S. patent application entitled, "WIDE INSTRUCTION WORD GRAPHICS PROCESSOR," filed on Jul. 15, 1999 as Ser. No. 09/353,420 and identified by attorney docket number 1247/A35, the disclosure of which is incorporated herein, in its entirety, by reference.

Figure 3:
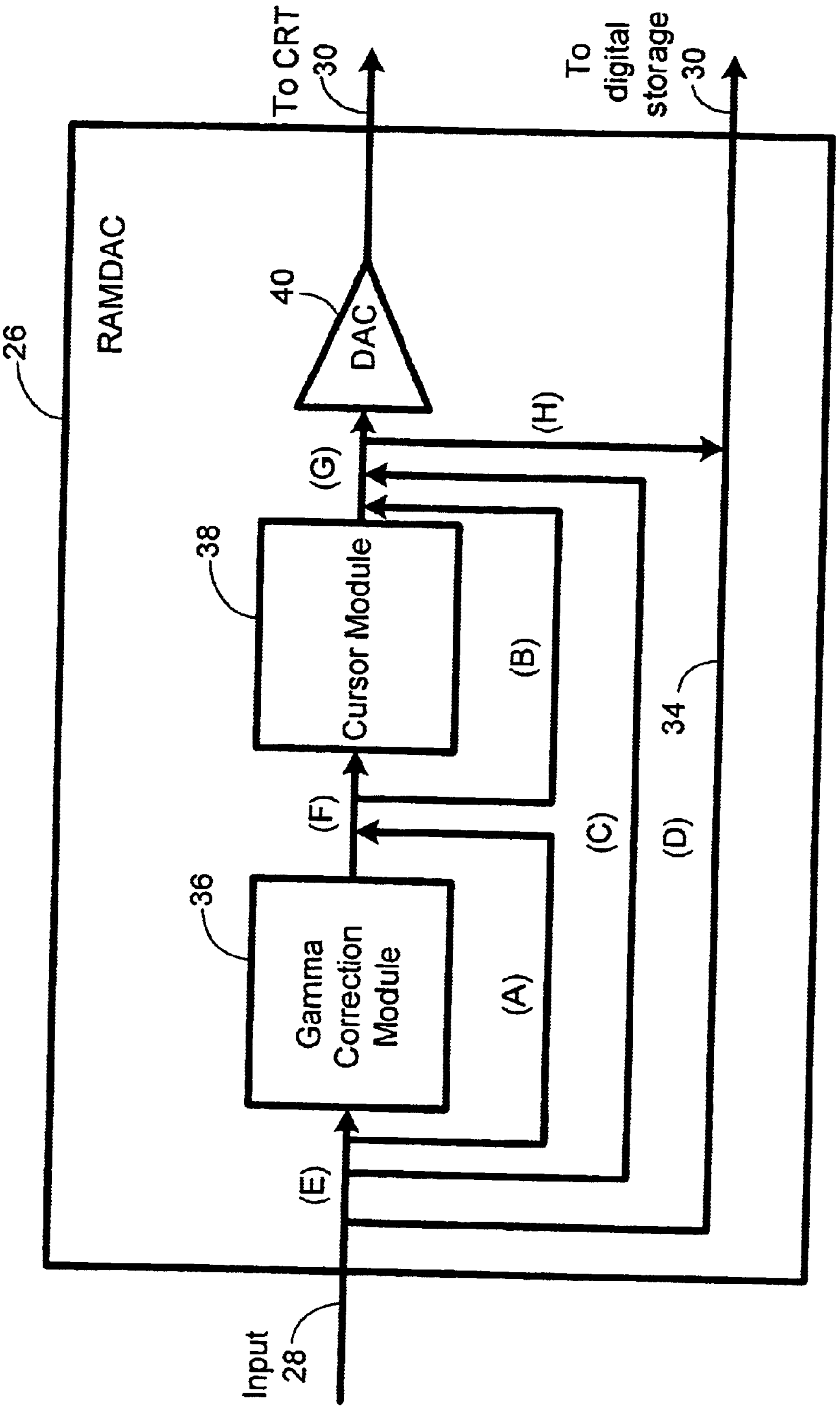
FIG. 3 schematically shows a random access memory digital to analog converter that may be configured in accord with preferred embodiments of the invention.

FIG. 3 schematically shows a RAMDAC 26 configured in accord with preferred embodiments of the invention. In illustrative embodiments, each RAMDAC 26A shown in FIG. 2B is configured in this manner. Specifically, the RAMDAC 26 includes an input 28 for receiving processed graphics request streams from the graphics accelerator 10, an analog output 30 for forwarding graphics request streams to a monitor or display device (e.g., a cathode ray tube monitor, not shown), a digital output 32 that couples with a digital storage device (not shown), a plurality of functional modules, and a switching system 34 that alternatively electrically connects combinations of the various functional modules with the input 28 and the output(s) 30 and 32. The functional modules include, among other things, a gamma correction module 36 that applies gamma correction operations to processed graphics request streams, a cursor module 38 for adding cursor data to processed graphics request streams, and a digital to analog converter 40 for converting digital graphics request streams to analog graphics request streams. The digital to analog converter 40 preferably is coupled with the monitor for displaying output graphics request streams. Each of the functional modules may operate in accord with conventional processes.

In accordance with preferred embodiments of the invention, the switching system 34 comprises a plurality of paths that may be switched to be either "on" or "off," as necessary, to electrically connect the various functional modules. The paths are identified in FIG. 3 as follows:

Path A: connecting the RAMDAC input 28 with the input of the cursor module 38 to bypass the gamma correction module 36;

Path B: connecting the input of the cursor module 38 with the input of the digital to analog converter 40, thus bypassing the cursor module 38;

Path C: connecting the RAMDAC input 28 with the input of the digital to analog converter 40, thus bypassing both the gamma correction module 36 and the cursor module 38;

Path D: connecting the RAMDAC input 28 to the digital output 32 of the RAMDAC 26;

Path E: connecting the RAMDAC input 28 to the input of the gamma correction module 36;

Path F: connecting the output of the gamma correction module 36 with the input of the cursor module 38;

Path G: connecting the output of the cursor module 38 with the input of the digital to analog converter 40; and Path H: connecting the output of the cursor module 38 with the digital output.

As shown in the figure and noted above, paths A–D and H are considered bypass paths since they permit graphics request streams to bypass at least one of the functional modules. It should be noted that when a bypass path is on, the input to the functional module(s) being bypassed also is bypassed. Stated another way, when a bypass path is on, the graphics request stream does not pass through the functional module(s) being bypassed. In preferred embodiments, path H is omitted.

For each graphics request stream, various combinations of the paths may be set to be on to create a single path between the RAMDAC input 28 and the output. In preferred embodiments, the RAMDAC 26 includes a two bit register that is set to control which paths are set to be on and off, thus setting the state of the paths within the RAMDAC 26. Accordingly, a graphics request stream may be preceded by header with a two bit code setting the state of the RAMDAC 26. Examples of such combinations follow. It should be noted that although a two bit code is noted, more bits may be used to vary the combinations of paths that may be on and off at a given time.

EXAMPLE 1

A gamma corrected graphics request stream that does not require processing by the gamma correction module 36 is received. Accordingly, paths E, A, F, and G are on, while the other paths are off. Such request stream thus traverses into the input 28 of the RAMDAC 26 at path E, bypasses the gamma correction module 36 via path A, passes through the cursor module 38 via path F, and through the digital to analog converter 40 via path G. It should be noted that a graphics request stream is deemed to be processed by a functional module through which it passes.

EXAMPLE 2

A graphics request stream to be displayed on the monitor without a cursor is received. To that end, paths E, F, B, and G are on, while the other paths are off. Accordingly, the graphics request stream passes through the gamma correction module 36 via path E, bypasses the cursor module 38 via path F and B, and is converted to an analog signal through the digital to analog converter 40 via path G.

EXAMPLE 3

A graphics request stream that requires neither gamma correction nor cursor data is received. To that end, paths E, C, and G are on, while the other paths are off. Accordingly, the graphics request stream bypasses the gamma correction module 36 and cursor module 38 via paths E and C, and passes through the digital to analog converter 40 via path G.

EXAMPLE 4

A graphics request stream requiring both gamma correction and a cursor is received. To that end, paths E, F, and G are on, while the other paths are off. Accordingly, the graphics request stream passes through the gamma correction module 36 via path E, passes through the cursor module 38 via path F, and passes through the digital to analog converter 40 via path G.

EXAMPLE 5

A graphics request stream may bypass all functional modules by turning path D on, and turning the other paths off. In such case, the graphics request stream is transmitted directly to the digital output 32. The digital output 32 may be coupled with a storage device for storing the data.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

Having thus described the invention, what we desire to claim and secure by Letters Patent is:

1. A back end unit for use with a graphics processor, the back end unit comprising:

an input for receiving graphics data streams from the graphics processor;

a gamma correction module that applies gamma correction operations to graphics data streams;

a cursor module that adds cursor data to graphics data streams;

a digital to analog converter that converts digital graphics data streams into analog form;

an output for transmitting graphics data streams; and a plurality of paths coupled with the input and the output, the plurality of paths being capable of combining into a single path between the input and the output for directing graphics data streams between the input and the output, the single path formed by the plurality of paths permitting graphics data streams to pass through no more than two of the gamma correction module, the cursor module, and the digital to analog converter.

2. The back end unit as defined by claim 1 wherein the plurality of paths includes a pass-through path that permits graphics data streams to pass directly from the input to the output.

3. The back end unit as defined by claim 1 wherein the plurality of paths includes a gamma module bypass path that permits graphics data streams to bypass the gamma correction module.

4. The back end unit as defined by claim 3 wherein the gamma module bypass path permits graphics data streams to pass through at least one of the cursor module and the digital to analog converter.

5. The back end unit as defined by claim 1 wherein the plurality of paths includes a double module bypass path that permits graphics data streams to bypass both the gamma correction module and the cursor module.

6. The back end unit as defined by claim 5 wherein the double module bypass path permits graphics data streams to pass through the digital to analog converter.

7. The back end unit as defined by claim 1 wherein the plurality of paths includes a cursor module bypass path that permits graphics data streams to bypass the cursor module.

8. The back end unit as defined by claim 7 wherein the cursor module bypass path permits graphics data streams to pass through at least one of the gamma correction module and the digital to analog converter.

9. A back end unit for use with a graphics processor, the back end unit comprising:

an input for receiving graphics data streams;

a switching system;

a gamma correction module coupled with the switching system, the gamma correction module applying gamma correction to received graphics data streams;

a cursor module coupled with the switching system, the cursor module adding cursor data to received graphics data streams;

a digital to analog converter coupled with the switching system; and an output, the switching system providing a plurality of paths, the plurality of paths being capable of forming a single path for selectively electrically connecting the gamma correction module, the cursor module, and the digital to analog converter.

10. The back end unit as defined by claim 9 wherein the switching system provides an electrical path through no more than two of the gamma correction module, the cursor module, and the digital to analog converter.

11. The back end unit as defined by claim 9 wherein the plurality of paths include a pass-through path that permits graphics data streams to pass directly from the input to the output.

12. The back end unit as defined by claim 9 wherein the output is an analog output that forwards analog signals from the digital to analog converter, the back end unit further including a digital output that forwards digital signals, the switching system alternatively switching between the digital output and the analog output.

13. The back end unit as defined by claim 9 wherein the plurality of paths includes a gamma module bypass path that permits graphics data streams to bypass the gamma correction module.

14. The back end unit as defined by claim 13 wherein the gamma module bypass path permits graphics data streams to pass through at least one of the cursor module and the digital to analog converter.

15. The back end unit as defined by claim 9 wherein the plurality of paths includes a double module bypass path that permits graphics data streams to bypass both the gamma correction module and the cursor module.

16. The back end unit as defined by claim 15 wherein the double bypass path permits graphics data streams to pass through the digital to analog converter.

17. The back end unit as defined by claim 9 wherein the plurality of paths includes a cursor module bypass path that permits graphics data streams to bypass the cursor module.

18. The back end unit as defined by claim 17 wherein the cursor module bypass path permits graphics data streams to pass through at least one of the gamma correction module and the digital to analog converter.

19. A back end unit for use with a graphics processor, the back end unit comprising:

an input for receiving graphics data streams from the graphics processor;

an output for transmitting graphics data streams;

a plurality of functional modules between the input and the output, the plurality of functional modules including logic for processing graphics data streams received by the input; and a switching system capable of selectively combining the plurality of paths to form a single path coupling the input, output, and the plurality of functional modules, the switching system being capable of bypassing one or more of the functional modules.

20. The back end unit as defined by claim 19 wherein the plurality of functional modules includes a gamma correction module for applying gamma correction to received graphics data streams.

21. The back end unit as defined by claim 19 wherein the plurality of functional modules includes a cursor module for adding cursor data to received graphics data streams.

22. The back end unit as defined by claim 19 wherein the switching system is capable of coupling the input directly with the output to bypass the plurality of functional modules.

23. The back end unit as defined by claim 19 output includes an analog output that forwards analog signals, the back end further including a digital output that forwards digital signals, the switching system alternatively switching between the digital output and the analog output.

* * * * *